Patented Jan. 4, 1949

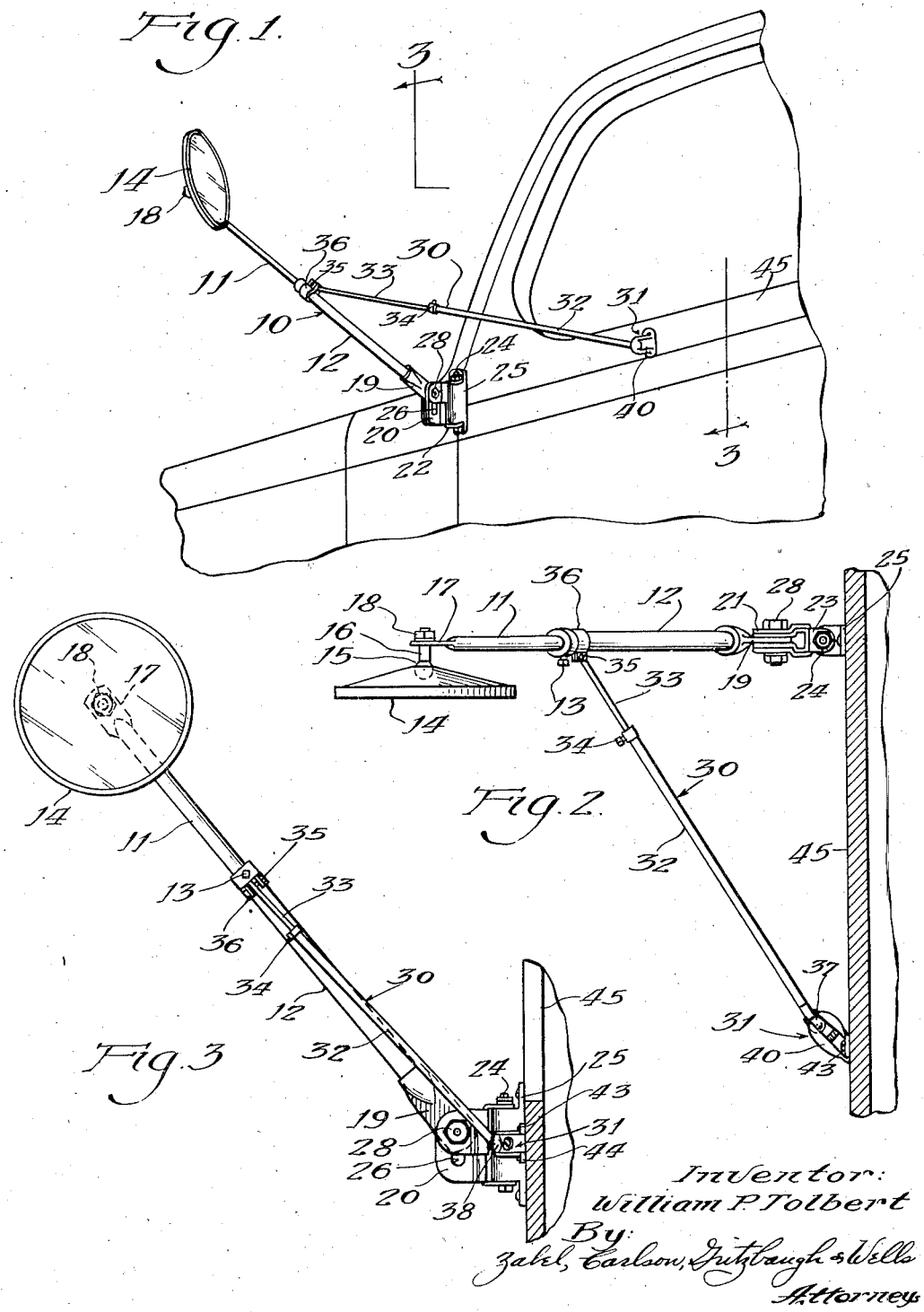

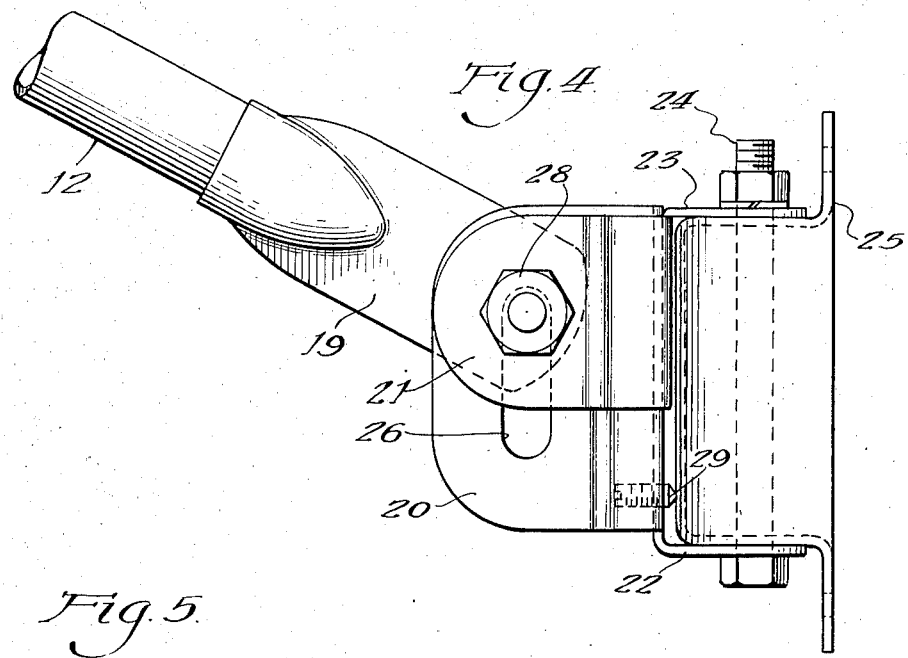
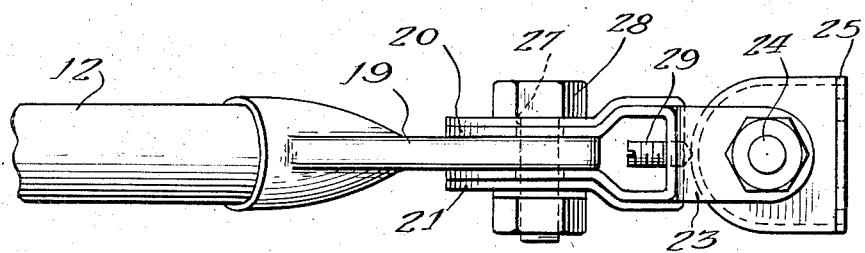
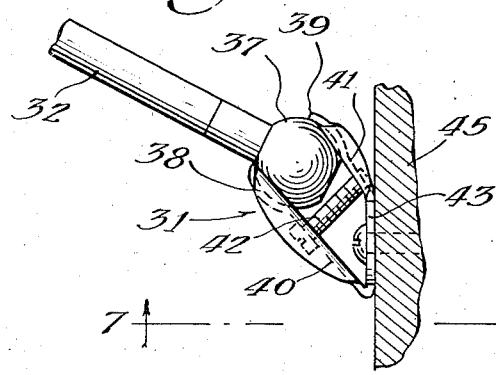
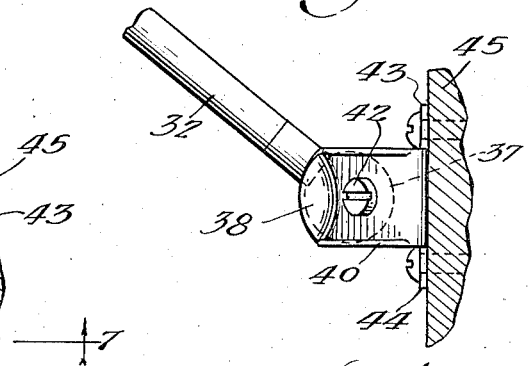

2,458,117

UNITED STATES PATENT OFFICE 2,458,117

REARVIEW MIRROR SUPPORT

William P. Tolbert, Fort Madison, Iowa, assignor to Anthes Force Oiler Company, Fort Madison, Iowa, a corporation of Iowa Application March 22, 1945, Serial No. 584,051

3 Claims. (Cl. 248—279)

The present invention relates to the mounting of rear view mirrors on vehicles and has for its principal object the provision of a novel mounting whereby the mirror may be held rigid and may also be folded out of the way with a minimum amount of difficulty. My invention is directed to the particular type of rear view mirror that is adapted to be mounted on the side of a vehicle, such as a truck, to project outwardly. In such devices the principal vibration of the mirror is not a vertical one, but is in a forward and backward direction. An important purpose of my invention is to provide a mounting that stabilizes the mirror so as to reduce this vibration to a minimum.

My invention contemplates a mirror mounting wherein the mirror arm is mounted by a bracket that may fit a door hinge of the vehicle or it may be attached to a vehicle door or frame. This mirror arm is combined with a strut arm having a novel mounting to the vehicle door or body so as to provide rigidity in a forward and backward direction for the mirror arm without limiting the swinging of the mirror arm in a vertical direction when it is necessary to get the arm and mirror out of the way of any obstruction in close quarters. The invention is not limited to bracing the mirror arm in a horizontal direction, but it applies also where it is desired to accomplish the bracing in a vertical direction.

The nature and advantages of my invention will appear more fully from the following description and the accompanying drawings wherein a preferred form of the invention is shown. It should be understood however that the drawings and description are illustrative only and should not be taken as limiting the invention except insofar as it is limited by the claims.

In the drawings:

Figure 1 is a fragmentary perspective view of a portion of a vehicle body showing a rear view mirror embodying my invention attached to the door thereof;

Figure 2 is a plan view of the device shown in Figure 1;

Figure 3 is a view looking in the direction of the arrows 3—3 of Figure 1;

Figure 4 is an enlarged fragmentary view in side elevation of the mounting brackets for the mirror arm;

Figure 5 is a plan view looking down on Figure 4;

Figure 6 is a fragmentary sectional view of the strut arm universal mounting embodied in the invention; and Figure 7 is a view looking upward at Figure 6 as indicated by the line 7—7.

Referring now to the drawings, my invention is embodied in a rear view mirror mounting which comprises a main mirror arm 10 having two telescoping sections 11 and 12 which are held in adjusted position with respect to each other by a set screw 13. A mirror 14 is mounted upon a ball 15 which has a stem 16 that is fastened to a flattened end 17 on the arm portion 11. The stem is reduced in diameter where it passes through the portion 17, and a nut 18 clamps the portion 17 on the stem.

The arm 10 has a flattened mounting head 19 at the end opposite the mirror. This mounting head is clamped in the jaws of a metal bracket 20 (see Figures 4 and 5). The bracket 20 fits within a smaller bracket 21 of channel shape. The bracket 20 has an ear 22, and the bracket 21 has an ear 23 by which they may be mounted upon a bolt 24. This bolt 24 may be a hinge bolt by which the door is hinged to the vehicle. The hinge cover is indicated at 25. The lower bracket 20 has elongated slots 26 in the leg portions thereof. The bracket 21 has round openings shown at 27 to receive a bolt 28 by which the two brackets are clamped upon the flattened head 19. In order to oppose swinging movement of the assembly of the head 19 and the brackets 20 and 21 about the bolt 24 I provide a screw 29 which is threaded in the bracket 20 so that it may be engaged with the cover 25.

In order to stabilize the mirror and prevent undue vibration thereof I provide a strut arm 30 that is connected to the arm 10 and extended to the vehicle door where it is mounted by a special bracket 31. The strut arm 30 is composed of two telescoping sections 32 and 33 that may be locked together by a set screw 34. The one end of the strut arm is pivoted by a bolt 35 and a clamping ring 36 to the arm 10. The end of the section 33 is flattened to provide for pivoting it on the bolt 35. This pivotal connection allows the arm 30 to be adjusted to the proper length for holding the mirror 14 and its arm 10 in the desired position. The head end of the section 32 of the arm 30 has a bearing portion 37 thereon which is substantially spherical. This portion engages two opposed spherically formed surfaces 38 and 39 of the leg portions 40 and 41 respectively of the bracket 31. It will be noted that the leg portion 40 is substantially longer than the leg portion 41 so that the two spherical parts 38 and 39 are opposite each other. The two leg portions 40 and 41 are clamped together by a screw bolt 42 that is threaded into the base of the leg portion 41. The bracket 31 has two mounting ears 43 and 44 by which it may be fastened to the vehicle door 45.

It is believed that the foregoing description is sufficient to indicate the nature of my invention. The device shown is installed by mounting the brackets 20 and 21 on the bolt 24 and by mounting the bracket 31 on the door 45. The bracket 31 normally should be substantially in horizontal alignment with the parts 24 and 25. The mirror can swing horizontally with the door of the vehicle as it is opened. Furthermore, because of the particular ball and socket mounting provided by the bracket mounting 31 and the ball 37 it is possible to swing the mirror up out of the way of obstructions in close quarters. The triangular bracing provided by the strut arm 30 functions to eliminate objectionable vibration in a forward and rearward direction which is so pronounced on rear view mirrors that stand out from the vehicle.

Having thus described my invention, I claim:

1. Mounting means for applying rear view mirrors and the like to vehicles comprising in combination a main mirror supporting arm, a bracket carrying said arm and adapted to be mounted on the vehicle, the mirror supporting arm being mounted for vertical swinging movement in the bracket, a strut arm having one end pivoted to the mirror arm at a distance from the bracket end thereof and on an axis at right angles to the pivotal axis of the main arm, and a bracket supporting the other end of said strut arm and spaced horizontally from the bracket carrying the mirror supporting arm and adapted to be mounted on the vehicle in spaced relation to the first named bracket, said last named bracket being connected with the strut arm by a universal joint.

2. Mounting means for applying rear view mirrors and the like to vehicles comprising in combination a main mirror supporting arm, a bracket carrying said arm and adapted to be mounted on the vehicle, a strut arm comprising two arm sections slidably engaged for endwise movement with respect to each other to vary the length of the strut arm, said arm having one end pivoted to the mirror arm at a distance from the bracket end thereof, and a bracket supporting the other end of said strut arm and spaced horizontally from the bracket carrying the mirror supporting arm and adapted to be mounted on the vehicle in spaced relation to the first named bracket, said last named bracket comprising a base mounting portion having front and back wing portions extending outwardly at an angle toward the mirror arm, the back wing portion being longer than the front portion, concave bearing surfaces in said portions and a convex bearing surface on the strut arm engaged therewith.

3. Mounting means for applying rear view mirrors and the like to vehicles comprising in combination a main mirror supporting arm, a bracket carrying said arm and adapted to be mounted on the vehicle, a strut arm having one end pivoted to the mirror arm at a distance from the bracket end thereof, and a bracket supporting the other end of said strut arm and spaced horizontally from the bracket carrying the mirror supporting arm and adapted to be mounted on the vehicle in spaced relation to the first named bracket, said last named bracket comprising a base mounting portion having front and back wing portions extending diagonally from the base portion toward the mirror arm, said portions providing two opposed spherical socket portions, adjustable screw means urging said socket portions together, and the strut arm having a ball end held in said portions.

WILLIAM P. TOLBERT.

REFERENCES CITED

The following references are of record in the file of this patent:

UNITED STATES PATENTS

| Number | Name | Date |
| --- | --- | --- |
| 418,704 | Duggan | Jan. 7, 1890 |
| 694,648 | Jordan | Mar. 4, 1902 |
| 815,947 | Fergusson | Mar. 27, 1906 |
| 972,480 | Southwick | Oct. 11, 1910 |
| 1,275,974 | Mosher | Aug. 13, 1918 |
| 1,280,013 | Goddard | Sept. 13, 1918 |
| 2,134,016 | Zink | Oct. 25, 1938 |
| 2,143,281 | Sauer | Jan. 10, 1939 |